(12) United States Patent
Zhang et al.

(10) Patent No.: US 6,662,333 B1
(45) Date of Patent: Dec. 9, 2003

(54) SHARED ERROR CORRECTION FOR MEMORY DESIGN

(75) Inventors: Kevin Zhang, Portland, OR (US);
Jenny R. C. Johnson, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/498,496

(22) Filed: Feb. 4, 2000

(51) Int. Cl.[7] .................................................. G06F 11/10
(52) U.S. Cl. ...................................... 714/767; 714/773
(58) Field of Search .................... 714/766, 767, 714/772, 773

(56) References Cited

U.S. PATENT DOCUMENTS

| | | | | |
|---|---|---|---|---|
| 5,164,944 A | * | 11/1992 | Benton et al. | 714/702 |
| 5,172,379 A | * | 12/1992 | Burrer et al. | 714/702 |
| 5,206,865 A | * | 4/1993 | Gruender, Jr. et al. | 714/753 |
| 5,291,498 A | * | 3/1994 | Jackson et al. | 714/753 |
| 5,481,552 A | * | 1/1996 | Aldereguia et al. | 714/773 |
| 5,490,155 A | * | 2/1996 | Abdoo et al. | 714/763 |
| 5,666,371 A | * | 9/1997 | Purdham | 714/763 |
| 5,734,664 A | * | 3/1998 | Saxena | 714/766 |
| 5,896,404 A | * | 4/1999 | Kellogg et al. | 714/763 |
| 5,922,080 A | * | 7/1999 | Olarig | 714/767 |
| 5,978,952 A | * | 11/1999 | Hayek et al. | 714/764 |
| 5,978,953 A | * | 11/1999 | Olarig | 714/758 |
| 6,038,693 A | | 3/2000 | Zhang | 714/768 |
| 6,353,910 B1 | * | 3/2002 | Carnevale et al. | 714/763 |

OTHER PUBLICATIONS

Wolfe, A., "Patents shed light on Merced's Innards", Electronic Engineering Times, Feb. 15, 1999.
Chen, et al., "Error–correcting codes for semiconductor memory applications: a state–of–the–art review" IBM J. Res. Develop. Vol 28, No. 2, Mar. 1984.

* cited by examiner

*Primary Examiner*—Stephen M. Baker (57) ABSTRACT

A shared error correcting circuit reduces memory overhead by sharing a fixed number of ECC bits among two or more memory units in a semiconductor memory. A single ECC block is used to generate check bits and syndrome bits. The ECC block tests each of the memory units by using the total number of ECC bits available in the ECC cells. Thus, the memory overhead is reduced from that in standard ECC designs.

9 Claims, 7 Drawing Sheets

SHARED ERROR CORRECTION FOR MEMORY DESIGN

TECHNICAL FIELD

The technical field is error correcting code for semiconductor memory.

BACKGROUND

Semiconductor memories are subject to errors that may affect operation of connected systems. A typical error may result when a particular memory location is exposed to one or more a particles. Such radiation may cause a data bit stored in the memory location to flip from a "1" to a "0."

Error correcting codes (ECC) are used to enhance reliability and state integrity of computer semiconductor memory subsystems. Error correcting codes are known that will correct a single error, and will detect, but not correct, a double error. Other ECCs will detect and correct multiple errors. For ECC applications, memory array chips may be organized so that errors generated in a chip can be corrected by the ECC.

Correction of single bit errors and detection of double bit errors may be accomplished by use of check bits. A typical ECC implementation appends a number of check bits to each data word. The appended check bits are used by ECC logic circuits to detect errors within the data word. The simplest and most common form of error control is implemented through the use of parity bits. A single parity bit is appended to a data word and assigned to be a 0 or a 1, so as to make the number of 1's in the data word even in the case of even parity codes, or odd in the case of odd parity codes.

Prior to transmission of the data word in a computer system, the value of the parity bit is computed at the source point of the data word and is appended to the data word. On receipt of the transmitted data word, logic at the destination point recalculates the parity bit and compares it to the received, previously appended parity bit. If the recalculated and received parity bits are not equal, a bit error has been detected. Use of parity codes has the disadvantage, however, of not being able to correct bit errors and cannot detect even bit errors. For example, if a data bit changes from a 0 to a 1 and another data bit changes from a 1 to a 0 (a double bit error), the parity of the data word will not change and the error will be undetected.

By appending additional parity bits to the data word, each corresponding to a subset of data bits within the data word, the parity bit concept may be extended to provide detection of multiple bit errors, or to determine the location of single or multiple bit errors. Once a data bit error has been detected, logic circuits may be used to correct the erroneous bit, providing single error correction.

A well known error correction code is the Hamming code, which appends a series of check bits to the data word as it is stored in memory. Upon a read operation, the retrieved check bits are compared to recalculated check bits to detect and to locate (i.e., correct) a single bit error. By adding more check bits and appropriately overlapping the subsets of data bits represented by the check bits, other error correcting codes may provide for multiple error corrections and detection. While current computer systems often incorporate single error correction and multiple error detection, the parity check bits required by the error code occupy space in the semiconductor memory. This space is not available for memory operations.

SUMMARY

A method for detecting and correcting errors in a semiconductor memory includes partitioning the memory into M memory blocks, each of the M memory blocks capable of containing k data bits. The k data bits include a plurality of error correcting code (ECC) bits generated by a common ECC block. The method further includes assigning r ECC bits to the M memory blocks and distributing the r ECC bits among the M memory blocks. The value of r is determined using the product M×k and the type of ECC code used. The M memory blocks share the common ECC block for ECC bits generation and for error detection and correction.

A shared ECC circuit operating with a semiconductor memory having a plurality of memory units includes a plurality of ECC cells corresponding to the plurality of memory units. Each of the plurality of memory units is capable of containing a plurality of data bits. The shared ECC circuit further includes a common ECC block that generates ECC bits. The ECC bits are included in the plurality of data bits, and a number of ECC bits in the plurality of ECC cells relates to a total number of data bits stored in the plurality of memory units. In addition, the ECC bits are distributed among the plurality of memory units, and the plurality of memory units share the common ECC block for ECC bits generation and for error detection and correction.

Figure 1:
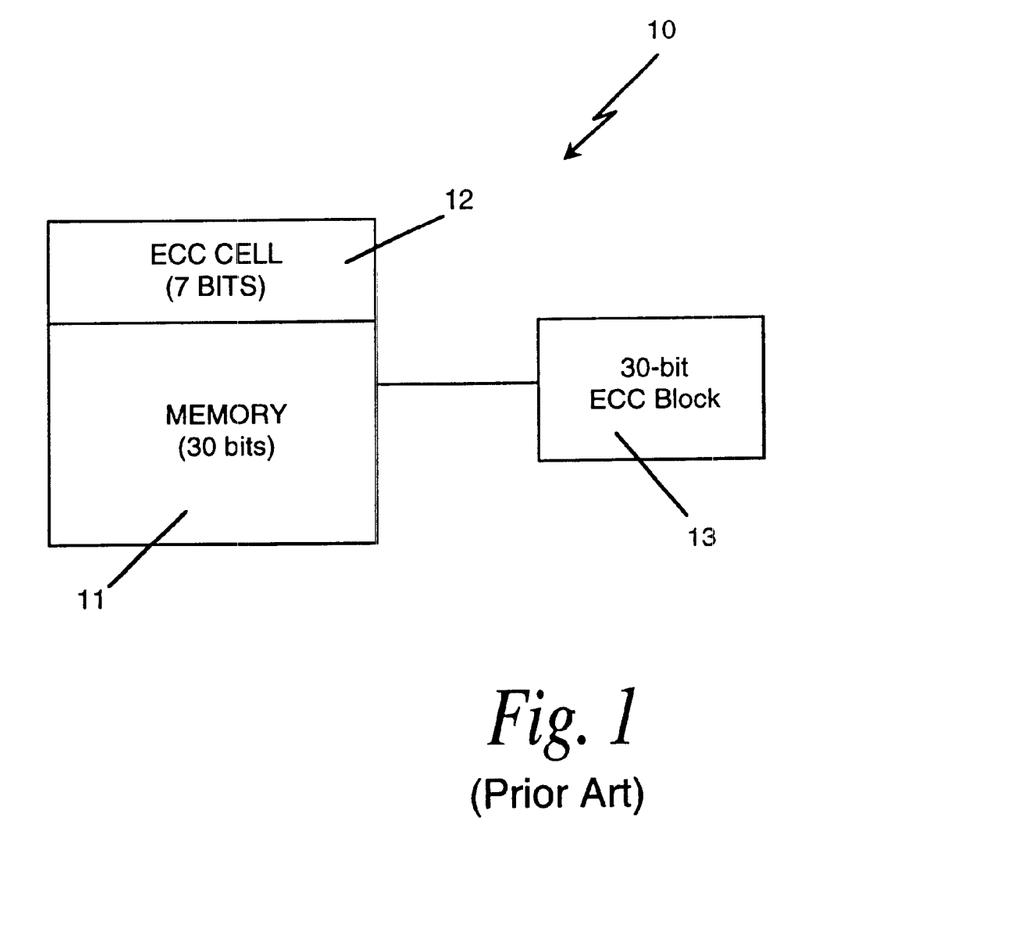
FIG. 1 is a block diagram of a prior art error correcting code circuit.

Hardware to implement ECC check bits using current systems is illustrated in FIG. 1. An error correcting code circuit 10 includes a memory line 11, which is shown in FIG. 1 including 30 data bits. Associated with the memory line 11 is an ECC cell 12 that stores a single data value with one or more data bits. Referring to Table 1 above, seven ECC bits are required to be stored in the ECC cell 12 to accomplish single bit error correction and double bit error detection in the memory line 11. An ECC block 13 is used to generate the ECC bits and to perform the error correcting/detecting code operations including checking the data bits in the memory line 11 during read and write operations.

DESCRIPTION OF THE DRAWINGS

The detailed description will reference the following figures, in which like numerals refer to like items, and in which.

DETAILED DESCRIPTION

Error correcting code (ECC) circuits are widely used in semiconductor memory designs to correct single-bit errors and to detect double-bit errors. One common ECC code is the SEC-DED (single error correction -double error detection) code. Other ECC codes are capable of detecting more than two errors and correcting more than single errors.

The ECC circuits perform their error checking functions by generating a number of check bits for a specific number of data bits, and then writing the check bits to memory with the data bits. The check bits are then used during subsequent read-write cycles or other memory accesses to verify the correct values for the data bits. The number of check bits required to implement the ECC depends on the number of data bits being read. As shown in Table 1, as a number of data bits being read increases, the number of required SEC-DED ECC bits also increases.

TABLE 1

| Data Bits | ECC Bits |
|---|---|
| 12–26 | 6 |
| 27–57 | 7 |
| 58–120 | 8 |
| 121–247 | 9 |

Hardware to implement ECC check bits using current systems is illustrated in FIG. 1. An error correcting code circuit 10 includes a memory line 11, which is shown in FIG. 1 including 30 data bits. Associated with the memory line 11 is an ECC cell 12. Referring to Table 1 above, seven ECC bits are required to be stored in the ECC cell 12 to accomplish single bit error correction and double bit error detection in the memory line 11. An ECC block 13 is used to generate the ECC bits and to perform the error correcting/detecting code operations including checking the data bits in the memory line 11 during read and write operations.

As is obvious from FIG. 1, using the error correcting code circuit 10 means a large percentage of the available memory area is devoted to storage of the ECC bits 12. Using the error correcting code circuit 10 is particularly inefficient if a memory line contains fewer than the maximum number of data bits covered by the required number of ECC bits. For example, if a memory line contains 27 data bits, then seven ECC bits will be required for single error correction and double error detection. The same number of ECC bits (i.e., seven ECC bits) is required if the memory line contains 57 data bits.

Figure 2A:
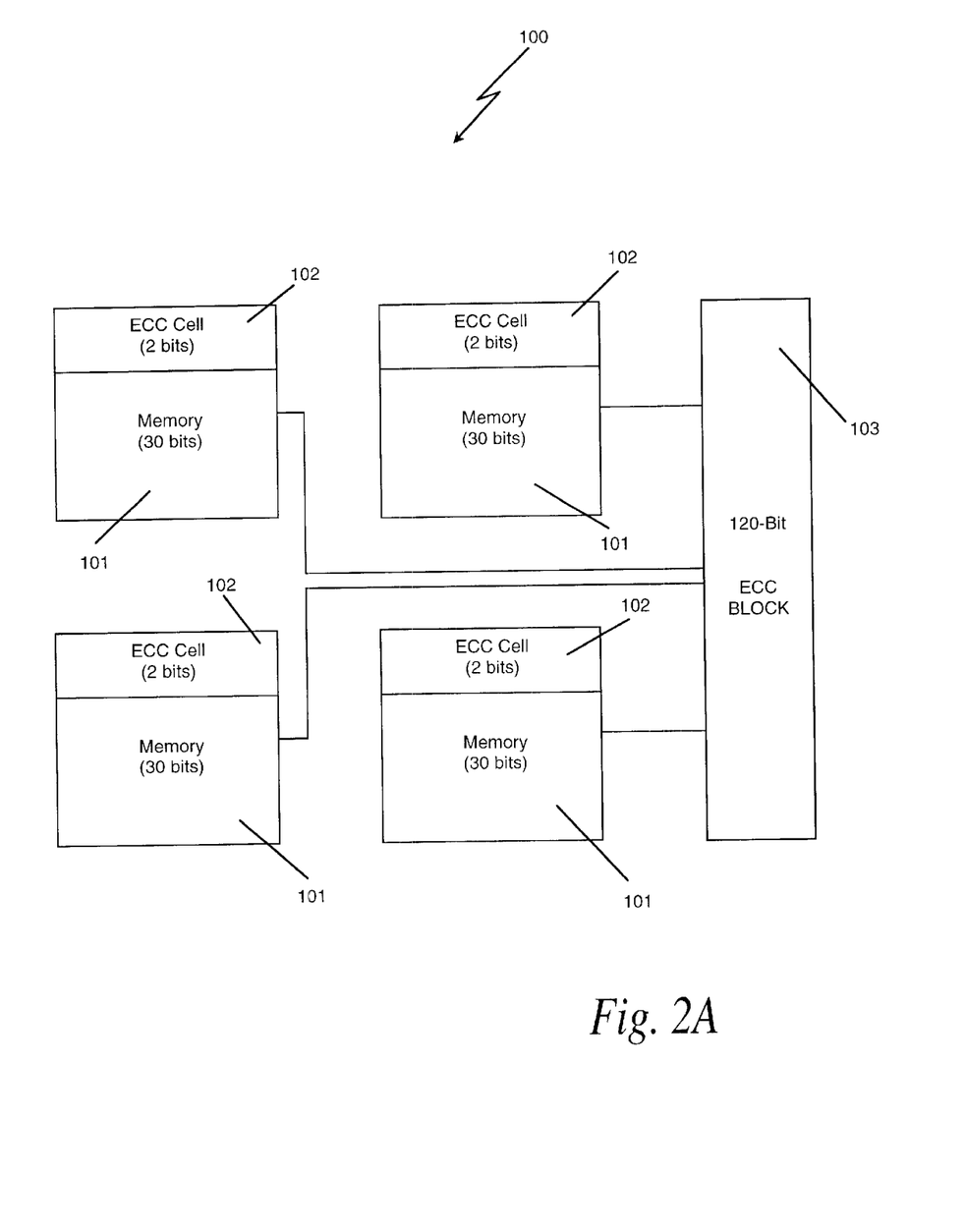
FIGS. 2A–2C illustrate exemplary block diagrams of a shared error correcting code circuit.

To improve the efficient allocation of memory space and still accomplish error correction and error detection, a shared error correcting code (ECC) circuit 100 is provided as shown in FIG. 2A. The ECC circuit 100 may be used with any type of memory in a computer system. For example, the ECC circuit 100 may be used with cache and with main memory. The ECC circuit 100 implements an error correcting code. In the discussion that follows, reference will be made to SEC-DED codes. However, as would be obvious to one of ordinary skill in the art and shown in FIG. 2B, the method and apparatus described is capable of applying ECC codes that are capable of detecting and correcting multiple errors (e.g., DEC-TED codes).

The ECC circuit 100 may be included on a dual in-line memory module (DIMM) card along with one or more memory chips and may be implemented within an ASIC chip, for example. The ASIC chip would serve to interconnect a data bus (not shown) of the computer system to the memory chips. Data passing from the data bus to the memory chips during execution ow a write operation would pass through the ECC circuit 100 prior to storage in the memory chips. Likewise, data passing from the memory chips to the data bus would also pass through the ECC circuit 100. Thus, the error detection and correction mechanism operates on the data as the data is being stored by the computer system in the memory chips. As discussed with respect to FIG. 1, the ECC code implemented in the ECC circuit 100 may be a SEC-DED, DEC-TED or higher error correcting code.

As shown in FIG. 2A, the ECC circuit 100 includes a memory having memory ways 101 and associated ECC cells 102. Depending on the type of memory, the ways 101 may be termed blocks or units. Although the ECC circuit 100 is shown with four memory ways 101 and four corresponding ECC cells 102, the ECC circuit 100 may include more or fewer memory ways and associated ECC cells. Finally, the ECC circuit 100 includes a 120 bit ECC block 103.

Figure 2B:
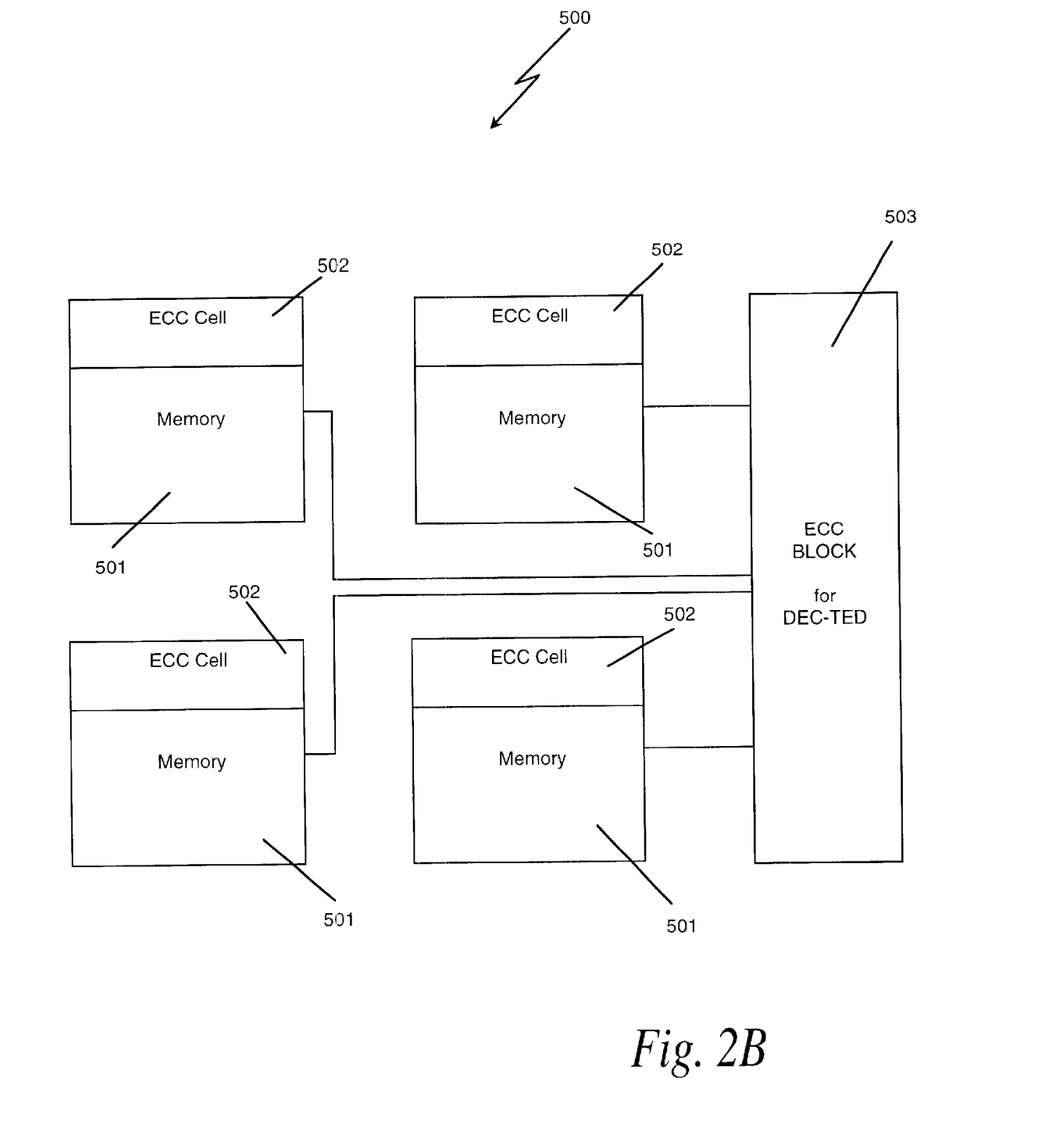

Referring to FIG. 2B, an ECC circuit 500 for detecting and correcting multiple errors includes a memory having memory ways 501 and associated ECC cells 502. Additionally, the ECC circuit 500 includes an ECC block for DEC-TED 503.

Figure 3A:
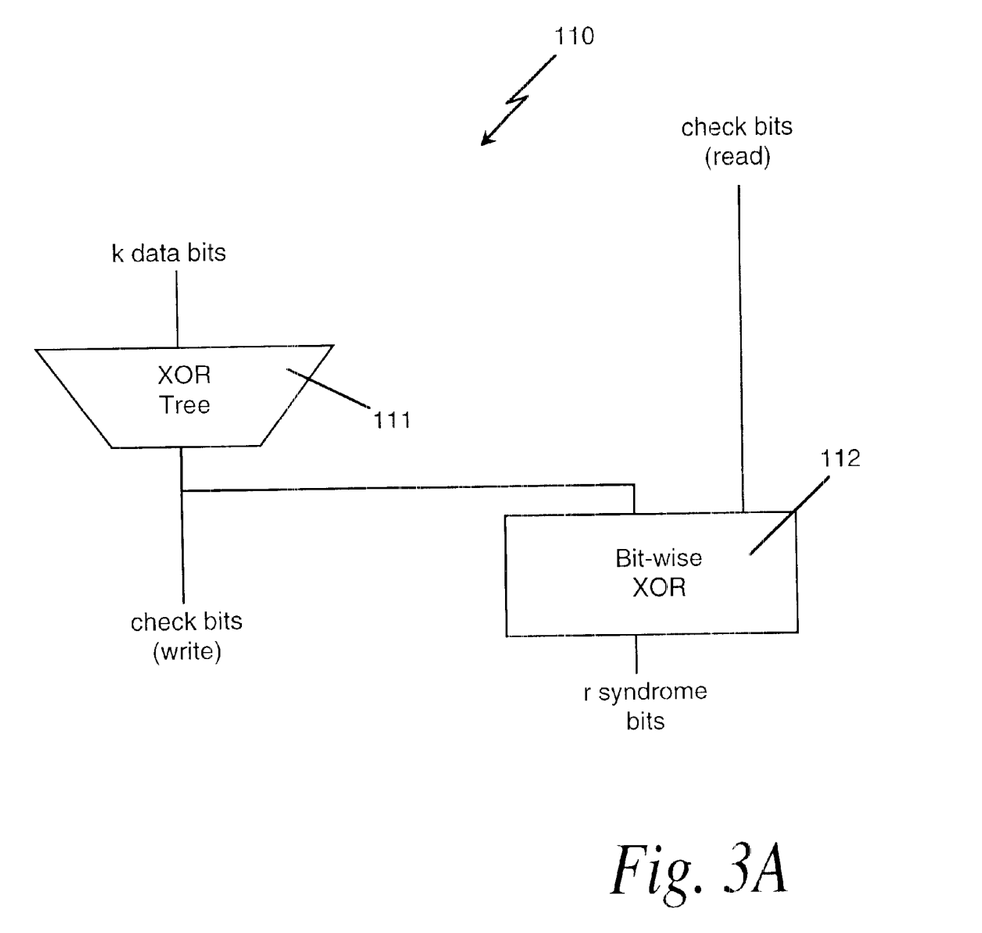
FIGS. 3A and 3B are block diagrams of an error correcting code block used with the shared error correcting code circuit of FIG. 2A.

FIG. 3A is a block diagram of a portion of the ECC block 103 that generates check bits and syndrome bits. As is well known in the art, syndrome bits are the product of a comparison of the ECC bits originally stored with the data in the memory during a data store operation, and a new set of ECC bits generated based on the data that has been fetched from the memory such as would occur during execution of a read command, or any memory access, in a computer system. That is, a syndrome bit is simply the XOR of a corresponding received ECC bit with a newly generated ECC bit. If the combination of the retrieved and the newly generated ECC bits creates any non-zero syndrome bits, an error within the retrieved data has been detected.

In FIG. 3A, a circuit 110 includes an XOR tree 111 and a bit-wise XOR module 112. In a write operation, the ECC bits are generated simultaneously by processing the data bits using a parity check matrix, for example. Such generation of ECC bits is well known in the art. In a read operation, the syndrome bits are generated simultaneously from the data bits read according to standard decoding processes. The same XOR tree 111 may be used for both the ECC bits and the syndrome bits as shown in FIG. 3A.

Figure 3B:
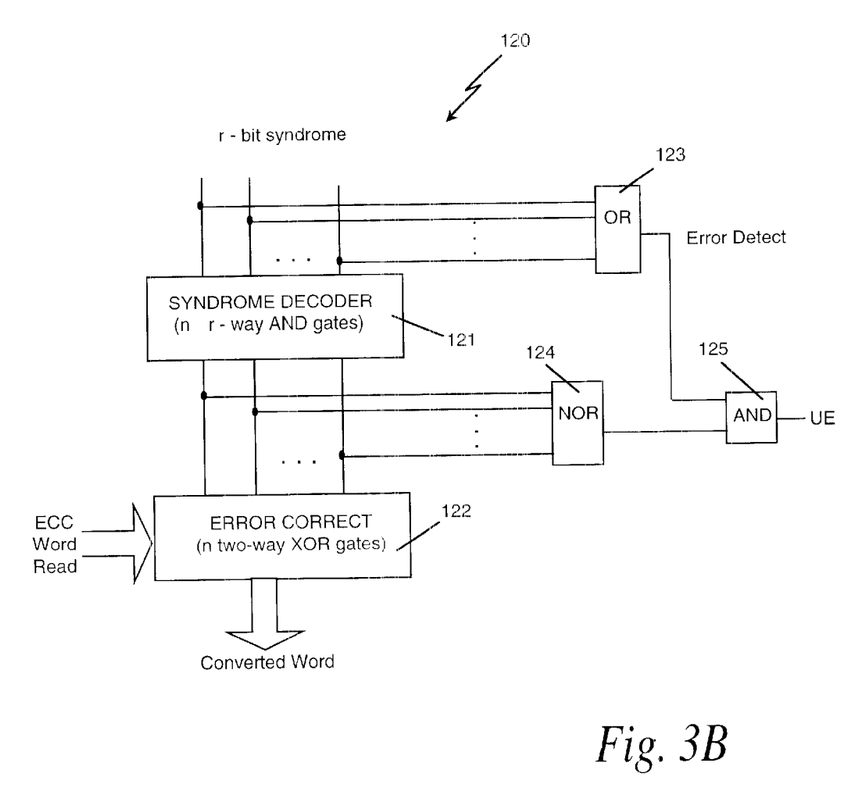

FIG. 3B is a block diagram of a circuit 120 that implements the error correction and detection function in the ECC block 103. As shown in FIG. 3B, the circuit 120 includes an r-way OR gate 123 for testing non-zero syndrome, an r-way AND gate 121 for decoding syndromes, and n-way NOR-gate 124 for generating an uncorrectable error (UE) signal, and a n-way XOR gate 122 for inverting the code bit in error.

Returning to FIG. 1, a conventional system having memory lines containing 30 bits, each memory line using its own unique ECC block, requires seven ECC bits to be stored with every memory line. Four such lines would require 28 ECC bits. In FIG. 2A, the single larger ECC block 103 can be shared across several memory ways 101. The memory ways 101 are shown with 30 data bits. Referring to Table 1, the total 120 bits of data require eight ECC bits to execute single error correction and double error detection. Thus, the ECC cells 102 need contain only two ECC bits each. The size of the ECC block 103 is determined by the size of the memory ways connected thereto. With only two ECC bits stored with each memory way 101, a 70 percent reduction in area overhead is achieved for the memory.

Figure 2C:
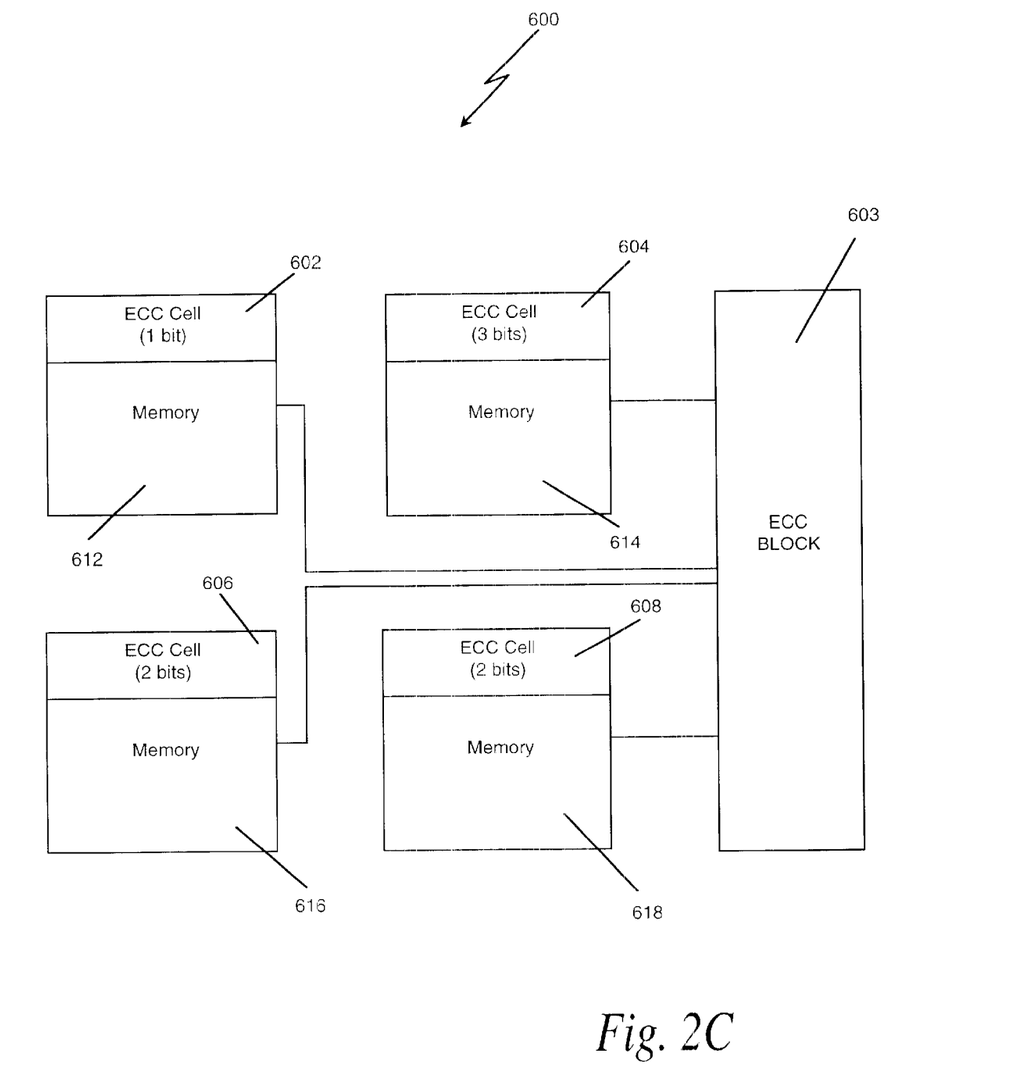

In FIG. 2A, the eight ECC bits are shown evenly distributed among the four memory ways 101. The ECC block 103 may be programmed to provide this even distribution of ECC bits. Alternatively, the ECC block 103 may divide the required ECC bits among the memory ways in a non-symmetrical manner, or may store the ECC bits in a memory location separate from the memory ways 101. Referring to FIG. 2C, an exemplary ECC circuit 600 includes an ECC block 603 that divides the required ECC bits 602, 604, 606, 608 among the memory ways 612, 614, 616, 618 in a non-symmetrical manner.

As noted above, to implement the shared ECC design, when data are written to memory, a specific number of check bits, or ECC bits are generated and stored with the data bits. To verify the absence of errors, the check bits are read out and compared to the ECC bits written into the memory. Because the ECC bits are shared across the four memory ways, any memory access (e.g., a write) will require reading out not only the data bits associated with the memory way, but also the data bits associated with the other three memory ways in order to regenerate the ECC bits (using the example illustrated in FIG. 2A).

Once the regenerated ECC bits are available, the bit-wise comparison discussed above may be completed to generate the syndrome bits. Any non-zero syndrome bits may indicate an error in the data bits stored in the memory way 101.

Although the ECC circuit described above is intended to correct single bit errors, similar circuits may be constructed that will correct double-bit and larger errors.

Figure 4:
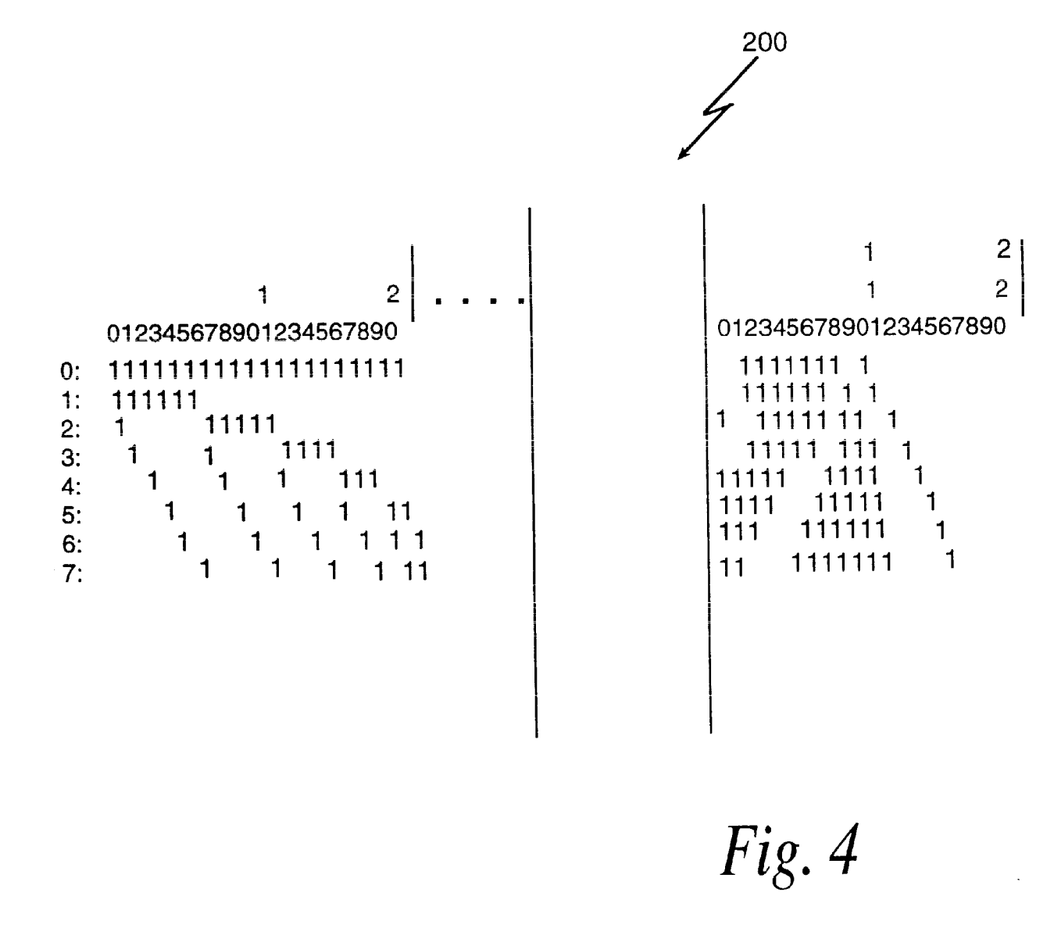
FIG. 4 illustrates a portion of a matrix representing a SEC-DED error correcting code that may be used with the error correcting code circuit of FIG. 2A.

FIG. 4 is a portion of a matrix that represents a (128, 120) SEC-DED error correcting code 200. The data bits are represented as bits 0–119, and the stored ECC check bits are bits 120–127. Use of the code 200 maybe made by way of an example. Suppose that each way of memory contains 30 data bits; Way0 is bits 0–29; Way1 is in bits 30–59; Way2 is bits 60–89, and Way3 is bits 90–119. Suppose also that the data stored in all four memory ways is all zeroes. A read operation is issued to Way0 that returns the following raw (uncorrected) data:

10 0000 0000 0000 0000 0000 0000 0000

That is, there is a bit error in bit 0 of Way0, or bit 0 of the 120 data bits.

The newly generated ECC bits would be:

check bit 0: 1 check bit 1: 1 check bit 2: 1 check bit 3: 0 check bit 4: 0 check bit 5: 0 check bit 6: 0 check bit 7: 0

The syndrome is an XOR (or comparison) of the newly generated ECC bits and the previously stored ECC bits. The previously stored check bits that were read out on this operation were all zeroes, so the syndrome generated is:

syndrome bit 0: 1 syndrome bit 1: 1 syndrome bit 2: 1 syndrome bit 3: 0 syndrome bit 4: 0 syndrome bit 5: 0 syndrome bit 6: 0 syndrome bit 7: 0

This syndrome corresponds to column 0 of the matrix shown in FIG. 4, indicating the bit that should be flipped to correct the error.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for detecting and correcting errors in a semiconductor memory, comprising:

partitioning the memory into M memory blocks, each of the M memory blocks capable of containing k data bits per error correcting code (ECC) code word, wherein the k data bits relate to a plurality of ECC bits generated by a common ECC block;

assigning r ECC bits to the M memory blocks, wherein the value of r is determined using the product M×k and the type of ECC code used; and distributing the r ECC bits among the M memory blocks, wherein the M memory blocks share the common ECC block for ECC bits generation and for error detection and correction.

2. The method of claim 1, wherein the memory is divided into four memory blocks, each of the four memory blocks including a corresponding ECC cell.

3. The method of claim 1, wherein the ECC bits are divided equally among the M memory blocks.

4. The method of claim 1, wherein the r ECC bits are distributed non-symmetrically among the M memory blocks.

5. The method of claim 1, further comprising:

reading data bits from the M memory blocks;

reading the r ECC bits from the M memory blocks;

regenerating ECC bits based on the k data bits; and comparing the r ECC bits and the regenerated ECC bits to detect single bit errors and multiple bit errors.

6. The method of claim 5, further comprising correcting the single bit errors.

7. The method of claim 5, further comprising correcting the multiple bit errors.

8. A shared error correcting code (ECC) circuit operating with a semiconductor memory having a plurality of memory units, comprising:

a plurality of ECC cells corresponding to the plurality of memory units, wherein each of the plurality of memory units is capable of containing a plurality of data bits for each ECC code word; and a common ECC block that generates ECC bits, wherein a number of ECC bits in the plurality of ECC cells relates to a total number of data bits stored in the plurality of memory units for each ECC code word, wherein the ECC bits are distributed among the plurality of memory units, wherein the plurality of memory units share the common ECC block for ECC bits generation and for error detection and correction, and wherein the ECC bits correct multiple bit errors in the plurality of memory units.

9. A shared error correcting code (ECC) circuit operating with a semiconductor memory having a plurality of memory units, comprising:

a plurality of ECC cells corresponding to the plurality of memory units, wherein each of the plurality of memory units is capable of containing a plurality of data bits for each ECC code word; and a common ECC block that generates ECC bits, wherein a number of ECC bits in the plurality of ECC cells relates to a total number of data bits stored in the plurality of memory units for each ECC code word, wherein the ECC bits are distributed among the plurality of memory units, wherein the plurality of memory units share the common ECC block for ECC bits generation and for error detection and correction, and wherein the ECC bits are distributed non-symmetrically among the plurality of memory units.

* * * * *